(12) United States Patent
Wei et al.

(10) Patent No.: US 11,026,159 B2
(45) Date of Patent: Jun. 1, 2021

(54) ENTITY AND USER EQUIPMENT FOR A MOBILE TELECOMMUNICATIONS SYSTEM

(71) Applicant: Sony Corporation, Tokyo (JP)

(72) Inventors: Yuxin Wei, Basingstoke (GB); Brian Alexander Martin, Basingstoke (GB); Vivek Sharma, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 121 days.

(21) Appl. No.: 16/338,494

(22) PCT Filed: Oct. 5, 2017

(86) PCT No.: PCT/EP2017/075371
§ 371 (c)(1),
(2) Date: Apr. 1, 2019

(87) PCT Pub. No.: WO2018/065527
PCT Pub. Date: Apr. 12, 2018

(65) Prior Publication Data
US 2020/0045617 A1    Feb. 6, 2020

(30) Foreign Application Priority Data

Oct. 6, 2016   (EP) .................................... 16192705

(51) Int. Cl.
*H04W 48/12*        (2009.01)
*H04W 8/08*         (2009.01)
(Continued)

(52) U.S. Cl.
CPC ............. *H04W 48/12* (2013.01); *H04W 8/08* (2013.01); *H04W 48/14* (2013.01); *H04W 48/16* (2013.01);
(Continued)

(58) Field of Classification Search
CPC ....... H04W 8/08; H04W 48/12; H04W 48/14; H04W 48/16
See application file for complete search history.

(56) References Cited

U.S. PATENT DOCUMENTS

2014/0287750 A1*  9/2014  Fox ................... H04W 48/12
                                                     455/434
2015/0024746 A1*  1/2015  Adachi .............. H04W 36/04
                                                     455/435.1
(Continued)

FOREIGN PATENT DOCUMENTS

WO    2015/166840 A1    11/2015
WO    2017/174447 A1    10/2017

OTHER PUBLICATIONS

Sony, "System Information Enhancements for NR", 3GPP TSG RAN WG2 Meeting No. 95 bis R2-166735, Kaohsiung, Taiwan, Oct. 10-14, 2016, 3 pages.

(Continued)

*Primary Examiner* — Jamal Javid
*Assistant Examiner* — Ryan C Kavleski
(74) *Attorney, Agent, or Firm* — Xsensus LLP

(57) ABSTRACT

A mobile telecommunications system anchor entity for a mobile telecommunications system is provided. The mobile telecommunications system has at least one entity serving at least one user equipment, wherein the at least one entity and the at least one user equipment are located in a common system information area. The mobile telecommunications system has circuitry, which performs transmitting minimum system information to the at least one user equipment, wherein the minimum system information includes system information area identifier information.

20 Claims, 7 Drawing Sheets

(51) Int. Cl.
  *H04W 48/14* (2009.01)
  *H04W 48/16* (2009.01)
  *H04W 72/04* (2009.01)
  *H04W 72/12* (2009.01)

(52) U.S. Cl.
  CPC ..... *H04W 72/042* (2013.01); *H04W 72/1289* (2013.01)

(56) References Cited

U.S. PATENT DOCUMENTS

2017/0048826 A1    2/2017  Kishiyama
2020/0084681 A1*   3/2020  Frenger .................. H04W 8/08

OTHER PUBLICATIONS

Catt, "System Information Area", 3GPP TSG RAN WG2 Meeting No. 95 R2-164809, Gothenburg, Sweden, Aug. 22-26, 2016, pp. 1-5.

Sony, "System Information Enhancements for NR", 3GPP TSG RAN WG2 Meeting No. 95 R2-165032, Gothenburg, Sweden, Aug. 22-26, 2016, 3 pages.

Catt, "On-demand system information delivery mechanism", 3GPP TSG RAN WG2 Meeting No. 95bis R2-166120, Kaohsiung, Oct. 10-14, 2016, pp. 1-6.

Ericsson, "NR System information distribution—principles and example", 3GPP TSG RAN WG2 Meeting No. 95bis R2-166773, Kaohsiung, Taiwan, Oct. 10-14, 2016, pp. 1-5.

Samsung, "Discussion of NR IDLE mode operation", 3GPP TSG RAN WG2 Meeting No. 95bis R2-166388, Kaohsiung, Taiwan, Oct. 10-14, 2016, 5 pages.

CMCC, "Further considerations on minimum SI", 3GPP TSG RAN WG2 Meeting No. 95bis R2-167074, Kaohsiung, Oct. 10-14, 2016, 4 pages.

Samsung et al., "Principle/Guideline: Minimum SI TX in Camping Cell", 3GPP TSG RAN WG2 Meeting No. 95bis R2-166393, Kaohsiung, Taiwan, Oct. 10-14, 2016, 3 pages.

Catt, "System Information Categories and Delivery Mechanisms", 3GPP TSG RAN WG2 Meeting No. 95bis R2-164808, Gothenburg, Sweden, Aug. 22-26, 2016, pp. 1-3.

3GPP, "Technical Specification Group Radio Access Network; Study on New Radio Access Technology; Radio Interface Protocol Aspects", Release 14, TR 38.804, V0.3.0, Aug. 2016.

International Search Report dated Nov. 24, 2017 for PCT/EP2017/075371 filed on Oct. 5, 2017, 17 pages.

* cited by examiner

ENTITY AND USER EQUIPMENT FOR A MOBILE TELECOMMUNICATIONS SYSTEM

CROSS-REFERENCE TO RELATED APPLICATIONS

The present application is based on PCT filing PCT/EP2017/075371, filed Oct. 5, 2017 which claims priority to EP 16192705.8 filed Oct. 6, 2016, the entire contents of each are incorporated herein by reference.

TECHNICAL FIELD

The present disclosure generally pertains to entities and user equipment of a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so called Long Term Evolution ("LTE"), which is a wireless communication technology allowing high-speed data communications for mobile phones and data terminals and which is already used for 4G mobile telecommunications systems. Other candidates for meeting the 5G requirements are termed New Radio Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project"). There exists a successor LTE-A (LTE Advanced) allowing higher data rates as the basis LTE which is also standardized under the control of 3GPP.

For the future, 3GPP plans to further develop LTE-A, such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation. 5G technologies will allow a concept of a so called "virtual cell" or "local cell" or the like, which may also be based on NR. In this concept, a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been achieved in accordance with the introduction of the IP Multimedia System (IMS) for LTE, and a physical separation between control plane and user plane has been proposed as a possible solution for 5G or NR. Since requirements for the control plane should be basically robustness and wide coverage so as to maintain the service continuity, a macro or anchor entity (e.g. base station or Evolved Node B) should provide a link of the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE or other NR stations in the function as a virtual cell, local cell, micro or pico cell, Transmission/Reception Point (TRP) or the like should be able to take over responsibilities, which are typically handled, for example, in a base station, or eNodeB (Evolved Node B) as it is called in LTE (the eNodeB is the element in the evolved UTRA of LTE, the UTRA being the UMTS Terrestrial Radio Access). Such responsibilities, which are envisaged to be performed in the UE as a virtual cell or the other NR stations or entities mentioned above, are, for example, radio resource management, radio resource control (RRC), connection control, etc.

However, although there exist signaling techniques for the 5G technologies, it is generally desirable to improve the signaling.

SUMMARY

According to a first aspect, the disclosure provides a mobile telecommunications system anchor entity for a mobile telecommunications system including at least one entity serving at least one user equipment, wherein the at least one entity and the at least one user equipment are located in a common system information area, comprising circuitry configured to transmit minimum system information to the at least one user equipment, wherein the minimum system information includes system information area identifier information.

According to a second aspect, the disclosure provides a mobile telecommunications system entity for a mobile telecommunications system including at least one anchor cell entity serving at least one user equipment, wherein the at least one entity and the at least one user equipment are located in a common system information area and wherein the at least one anchor cell entity transmits minimum system information to the at least one user equipment, comprising circuitry configured to transmit at least one of other system information and scheduling information to the at least one user equipment.

According to a third aspect, the disclosure provides a mobile telecommunications system entity for a mobile telecommunications system including at least one anchor cell entity serving at least one user equipment, wherein the at least one entity and the at least one user equipment are located in a common system information area and wherein the at least one anchor cell entity transmits minimum system information to the at least one user equipment, comprising circuitry configured to transmit in a handover command at least one of a new system information area identifier, configuration information and an anchor entity identification.

According to a fourth aspect, the disclosure provides a user equipment for a mobile telecommunications system including at least one entity serving the user equipment, wherein the at least one entity and the user equipment are located in a common system information area, the user equipment comprising circuitry configured to receive minimum system information including system information area identifier information; and determine, based on the received system information area identifier information, whether a new system information area is entered.

Further aspects are set forth in the dependent claims, the following description and the drawings.

BRIEF DESCRIPTION OF THE DRAWINGS

Before a detailed description of the embodiments under reference of FIG. 1 is given, general explanations are made.

DETAILED DESCRIPTION OF EMBODIMENTS

Figure 1:
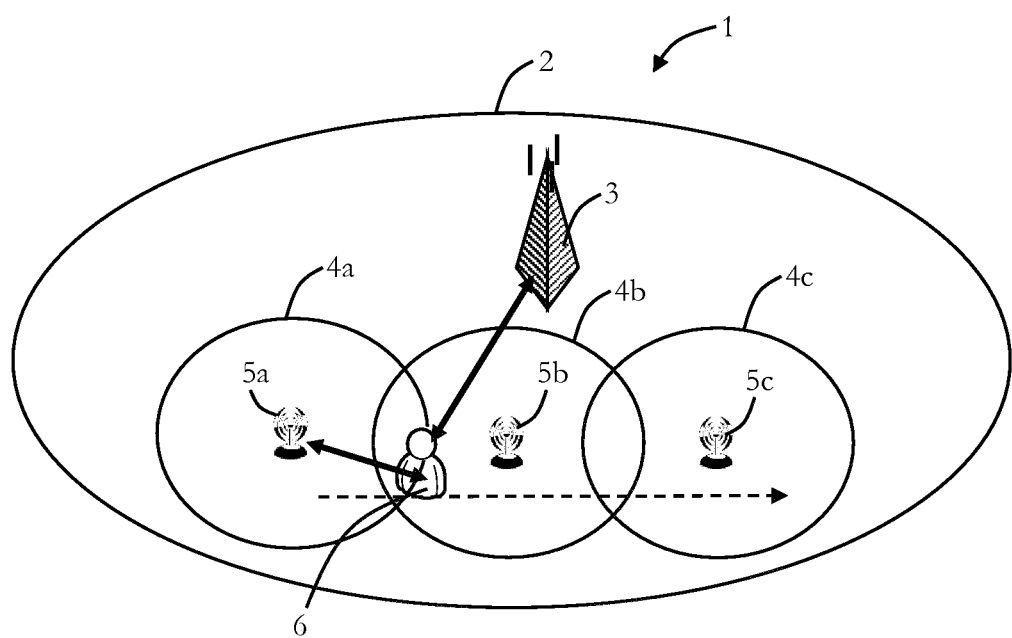
FIG. 1 illustrates a radio access network including an LTE cell and NR cells.

Before a detailed description of the embodiments under reference of FIG. 1, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so called Long Term Evolution ("LTE"), which is a wireless communication technology allowing high-speed data communications for mobile phones and data terminals and which is already used for 4G mobile telecommunications systems.

Other candidates for meeting the 5G requirements are termed New Radio Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project"). There exists a successor LTE-A (LTE Advanced) allowing higher data rates as the basis LTE which is also standardized under the control of 3GPP.

For the future, 3GPP plans to further develop LTE-A, such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so called "virtual cell", "local cell", "distributed unit", "TRP (Transmission/Reception Point)" or the like, which may also be based on NR. In this concept, a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell, local cell, "distributed unit" or "TRP (Transmission/Reception Point)" may communicate with UEs in unlicensed, shared licensed or licensed bands, and it backhauls to network preferably in licensed bands.

A logical separation between control plane and user plane has been achieved in accordance with the introduction of the IP Multimedia System (IMS) for LTE, and a physical separation between control plane and user plane has been proposed as a possible solution for 5G or NR. Since requirements for the control plane should be basically robustness and wide coverage so as to maintain the service continuity, a macro or anchor entity (e.g. base station or Evolved Node B) should provide a link of the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE or other NR stations in the function as a virtual cell, local cell, micro or pico cell, Transmission/Reception Point (TRP) or the like should be able to take over responsibilities, which are typically handled, for example, in a base station, or eNodeB (Evolved Node B) as it is called in LTE (the eNodeB is the element in the evolved UTRA of LTE, the UTRA being the UMTS Terrestrial Radio Access). Such responsibilities, which are envisaged to be performed in the UE as a virtual cell or the other NR stations or entities mentioned above, are, for example, radio resource management, radio resource control (RRC) connection control, etc.

As mentioned, the new Radio Access Technology (RAT) developed for 5G, called New Radio (NR), may be used in local cells and virtual cells in some embodiments, but there may also be small cells provided by NR eNodeBs and may be TRPs.

In 3GPP document R2-164809, "System Information Area", 3GPP TSG RAN WG" Meeting #95, Gothenburg, Sweden, 22-26 Aug. 2016, four scenarios are listed for an NR system information enhancement study and, moreover, a concept of a system information area is introduced.

The system Information Area (SIA) may be, in some embodiments, an area where all TRP/beams in the SIA are configured with at least some common essential system information (SI) and possibly part of non-essential SI which is broadcasted. In some embodiments, if this includes System Frame Number then all TRPs in the same SIA are synchronized. The broadcast can be handled by each TRP individually (single frequency network (SFN) transmission if synchronized), and/or via overlaid node(s) (e.g. LF macro), and/or a combination of local TRP broadcast and coverage overlaid node(s) e.g. different SI-Y broadcasted locally by each TRP and other common essential SI (SI-X)+non-essential SI which is broadcasted over overlaid node(s) (wherein SI-X is defined in R2-164809 as common part across an area involving potentially multiple TRP/beams that can be acquired early, and SI-Y as TRP/beam-specific part that may be acquired only before performing RACH).

Alternatively or additionally, the SIA may be a set of potentially different essential SIs used by different TRPs in the SIA commonly broadcasted by overlaid node(s) (e.g. LF macros) over the SIA coverage.

Some embodiments pertain to issues on how to configure/re-configure a system information area and how to provide system information across the system information area.

In some embodiments, the system information area concept may be supported in NR system information transmission/reception for an efficient system information distribution. Some embodiments pertain to solutions on how to dynamically configure/re-configure system information area including system information area identifier as well as anchor cell/cells in one system information area. Furthermore, some embodiments pertain to the solution how to transmit on-demand system information within the same or across different system information areas.

In some embodiments, a system information area is composed of one or more entities (e.g. LTE and/or NR eNodeB, LTE/NR central units (CU), LTE/NR distributed units (DU), LTE/NR Transmit and Receive Point (TRP), or the like). As discussed above, within this system information area, the system information (or minimum system information) would be the same or different among different entities. In some embodiments, each system information area will have a unique identifier and this identifier will be used by the UE to judge whether it moves to a new system information area or not.

In some embodiments, as mentioned, the system information area is introduced when anchor entity or anchor cell (or two or more anchor entities/cells) are provided.

As mentioned, in some embodiments, a system information area is an aggregation of one or more entities, wherein among these entities one or more anchor cells (anchor entities) are provided which collect system information and/or scheduling information of other entities and send the collected system and/or scheduling information to the UEs on behalf of these other entities, as will also be discussed further below.

Thereby, in some embodiments, radio resources which are used by the other entities/cells for the system information transmission can be released and, thus, power conserved, since the one or more anchor entities/cells take over the transmission of the system information and/or scheduling information. Thereby, the radio resource percentage for data transmission may be improved and the control signaling overhead on the other entities/cells may be reduced.

Furthermore, the initial access procedure to the other entities/cells may be accelerated and/or early decision of being not to access certain entity/cell may be made, based on the system information received on the anchor entity. Hence, how to configure/re-configure anchor cell within a system information area may be important in some embodiments.

In general, entities, such as a base station, eNodeB, etc., as mentioned, may be based on the principles of LTE (LTE-A) and/or be based on NR RAT, as also discussed above. The entity may be based on the known eNodeB of LTE, as one example, or it may be based on the discussed NR eNodeB. A user equipment, as discussed herein, may be, for example, a mobile phone, smartphone, a computer, tablet, tablet personal computer or the like including a mobile communication interface, or any other device which is able to perform a mobile telecommunication via, for example, LTE or NR, such as a hot spot device with a mobile communication interface, etc.

Some embodiments pertain to a mobile telecommunications system entity, in particular anchor entity, for a mobile telecommunications system including at least one entity serving at least one user equipment, wherein the at least one entity and the at least one user equipment are located in a common system information area, as discussed above. The (anchor) entity comprises circuitry configured to transmit minimum system information to the at least one user equipment, wherein the minimum system information includes system information area identifier information. The circuitry may include at least one of: processor, microprocessor, dedicated circuit, memory, storage, radio interface, wireless interface, network interface, or the like, e.g. typical electronic components which are included in a base station, such as an eNodeB. The minimum system information may also include cell access information, cell select information, information for acquiring other SI (everything not in minimum SI) and the like. The (anchor) entity may provide a respective (anchor) cell, as it is generally known. The mobile telecommunications system may be LTE based and/or NR based. In particular, it may be a mixture of LTE and NR, and may fall under at least one of the four cases as discussed in R2-164809 mentioned above. The minimum system information may further include information about entities within the system information area. This information can be provided, for example, by a list including identification numbers or the like of entities within the same system information area. The transmitting, as used herein, may also include broadcasting and unicasting.

The circuitry may be further configured to transmit information about entities within the system information area on demand to the at least one user equipment. The user equipment may transmit a request to the entity (or another entity which forwards the request to the entity) and the entity may transmit in response to this request the information about entities based on the request. In another embodiment, the circuitry may be further configured to transmit information about entities within the system information area to the at least one user equipment without any explicit request from user equipment, for example, in the case that the related system information has been changed.

The information about entities may be transmitted based on at least one of moving speed and moving direction of the user equipment. Hence, the information may include (only) information about entities (or entity cells) which may serve the user equipment on the way of the user equipment. The direction and the probability that the user equipment may be within the coverage area of an entity can be estimated based on the moving speed and/or moving direction of the user equipment.

Each entity in the system information area may transmit the minimum system information.

The minimum system information may be transmitted upon detection of at least one of an uplink reference signal or measurement report from the user equipment. Hence, the transmission of the minimum system information may be triggered by the user equipment transmitting its reference signal and/or measurement report. The user equipment may be in at least one of the following states: idle, connected and inactive connected.

As mentioned, the entity may be configured as the anchor entity and the circuitry may be configured to transmit the system information area identifier information.

The circuitry may be further configured to transmit system information of other entities located within the system information area. The system information of other entities may be minimum system information and/or other system information (i.e. system information which is not covered by the minimum system information).

The circuitry is further configured to transmit system information which is common with other entities of the system information area. The common system information may include common service system information and/or common resource related information. The common service information may be related to common services provided by the associated entities. For example, in some embodiment, for mMTC (massive machine type communication terminal), such as smart meter, common service configurations are used among utility meters in the specific area. The common resource related information may be related to common resources provided by the associated entities.

Another anchor entity (i.e. at least two anchor entities) may be located within the system information area and the circuitry may be further configured to perform the transmission of the minimum system information based on at least one of: a single frequency network for the at least two anchor entities or different broadcast channels for the at least two anchor entities. The entity may be a first mobile telecommunications system entity (e.g. LTE based or NR, etc.) and the other anchor entity may be a second mobile telecommunications system entity (e.g. NR based or LTE, etc.), hence they may belong to the same/different mobile telecommunications systems, such as LTE and NR. The transmitted minimum system information may include system information for the first mobile telecommunications system and for the second mobile telecommunications system.

The minimum system information may include an indicator for indicating that the minimum system information is associated with an anchor cell and/or for indicating that the current cell is an anchor cell. The indicator may be, for example, one bit which indicates that the cell is an anchor cell. Thereby the user equipment may know that the minimum system information stems from an anchor entity and/or that system information from another cell may be received from that anchor cell which is indicated by the indicator. In some embodiments, a synchronization signal includes an indicator for indicating that the minimum system information is associated with an anchor cell.

The circuitry may be further configured to transmit, in response to receiving an uplink reference signal, anchor entity system information.

In some embodiments, the system information area configuration can be changed dynamically. The dynamic change of the system information area configuration may include at least one of: splitting the system information area, merging system information areas, changing an anchor entity in the system information area, add a cell to the system information area, remove a cell from the system information area.

The circuitry may be further configured to transmit in response to a change of the system information area configuration updated system information included in the minimum system information. The updated system information may include system information to update the changed configuration.

The circuitry may be further configured to transmit in response to a change of the system information area configuration and updated system information is transmitted in a paging message.

Some embodiments pertain to a mobile telecommunications system entity for a mobile telecommunications system including at least one anchor cell entity serving at least one user equipment, wherein the at least one entity and the at least one user equipment are located in a common system information area and wherein the at least one anchor cell entity transmits minimum system information to the at least one user equipment. The entity comprises circuitry, as also discussed above, which is configured to transmit at least one of other system information and scheduling information to the at least one user equipment. As mentioned, other system information is system information which is not covered by the minimum system information. Scheduling information may include time/frequency/spatial information in order to inform user equipment about a time/frequency/spatial scheduling according to which (other and/or minimum) system information may be received.

The other system information or scheduling information may be transmitted in response to receipt of a request transmitted from the at least one user equipment. The request may be transmitted to the entity being configured as an anchor entity.

The content of the other system information may be based on the request.

The anchor entity may notify another entity to transmit the other system information and the request may be transmitted to the entity being configured as a target entity. A target entity may serve a target cell which will be entered by a user equipment.

The circuitry may be further configured, depending on the request, to unicast or broadcast the other system information to the user equipment.

The circuitry may be further configured to notify the anchor entity to transmit the other system information.

Some embodiments pertain to a mobile telecommunications system entity for a mobile telecommunications system including at least one anchor cell entity serving at least one user equipment, wherein the at least one entity and the at least one user equipment are located in a common system information area and wherein the at least one anchor cell entity transmits minimum system information to the at least one user equipment, comprising circuitry, as e.g. discussed above, configured to transmit in a handover command at least one of a new system information area identifier, configuration information and an anchor entity identification.

Some embodiments pertain to a user equipment for a mobile telecommunications system including at least one entity serving the user equipment, wherein the at least one entity and the user equipment are located in a common system information area. The user equipment comprises circuitry, as e.g. discussed above, configured to receive minimum system information including system information area identifier information, and determine, based on the received system information area identifier information, whether a new system information area is entered.

The circuitry may be further configured to receive information about entities within the system information area (see also above, where the entity transmits such information).

The circuitry may be further configured to request the information about entities within the system information area (see also above, where the entity transmits this information in response to the received request).

The circuitry may be further configured to transmit at least one of an uplink reference signal and a measurement report (see also above, where the entity transmits system information triggered by receiving an uplink reference signal and/or a measurement report).

Returning to FIG. 1, there is illustrated a RAN 1 which has a macro cell 2, which is established by a LTE eNodeB 3, which may also be exemplary an anchor entity. Moreover, three pico cells 4a, 4b and 4c are provided, which are each established by a respective NR eNodeB 5a, 5b and 5c, respectively. The NR cells 94a-c may also include more than one TRP/DU (transmission reception point/distributed unit) connected to a single CU (central unit).

A UE 6 can communicate with the LTE eNodeB 3 and, as long it is within one of the pico cells 4a, 4b and 4c, respectively, it can also communicate with the associated NR eNodeB 5a, 5b and 5c, respectively.

In this embodiment, the LTE eNodeB 3 and the NR eNodeBs 5a, 5b and 5c form a system information area, as also discussed above. The system information area has a specific identifier, on the basis of which the system information area can be identified.

The UE 6 may travel around (see dashed arrow), and in this simple mobility scenario, the UE 6 remains under the coverage of the same LTE cell 2, while passing through the coverage of multiple NR small cells, such as the three NR cells 4a-c.

In the following, different embodiments for a system area identifier configuration and system information distribution are discussed.

There are several options to provide the system information area configuration to the UE.

Figure 2:
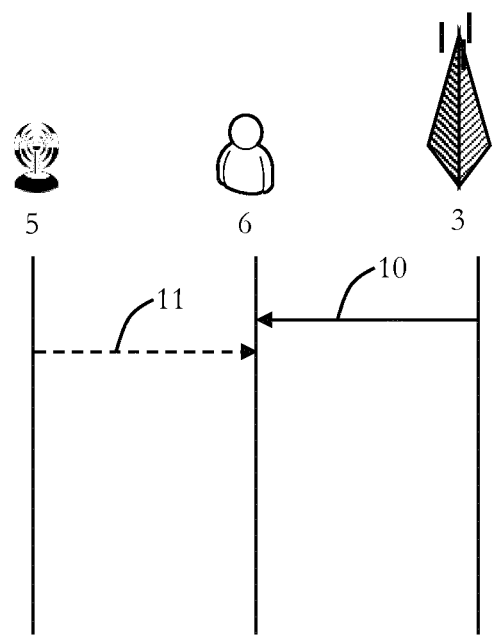
FIG. 2 illustrates a transmission scheme for system information pertaining to system information distribution.

As also illustrated in FIG. 2, showing message transmission for a LTE eNodeB 3, a UE 6 and an NR eNodeB 5, at 10, the system information area identifier and a list of entities (e.g. entity ID) included in this system information area are broadcasted e.g. in the minimum system information by one or two entities e.g. a CU or anchor entity, which is in the present example the LTE eNodeB 3 (alternatively or in addition to, the eNodeB 5 may also transmit the minimum system information as indicated at 11 with the dashed arrow). The UE 6 receives the minimum system information including the list of entities.

With this list, the UE 6 can determine whether it moves to a new area from e.g. synchronization signal which contains the identifier of that entity even before it accesses the system information of that entity.

Figure 3:
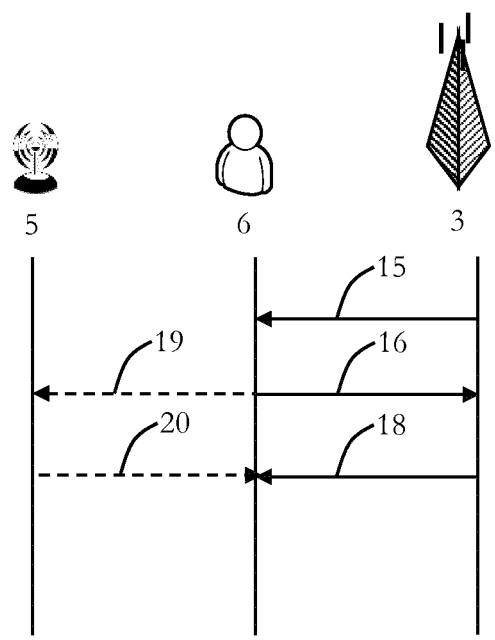
FIG. 3 illustrates a transmission scheme for system information pertaining to system information distribution.

As also illustrated in FIG. 3, in this alternative embodiment, at 15, the system information area identifier is broadcasted e.g. in the minimum system information by one or two entities, exemplary LTE eNodB 3, while the list of entities can be transmitted in on-demand manner. For requesting the list of entities, UE 6 may send a respective request to the eNodeB 3 at 16 (or alternatively or in addition to eNode B 5, as indicated with the dashed arrow 19) and the eNodeB 3 will transmit the list of entities to the UE 6 at 18 (or the eNodeB 5 at 20, dashed arrow).

Some UEs may keep static or may have limited mobility for a long time, such that for such UEs, the entity list may only be transmitted when the UE starts to move. In some embodiments, based on the UE's moving speed and direction, the anchor entity, e.g. LTE eNodeB 3, can send the partial list with the entities that will pass through by the UE with a high probability.

Figure 4:
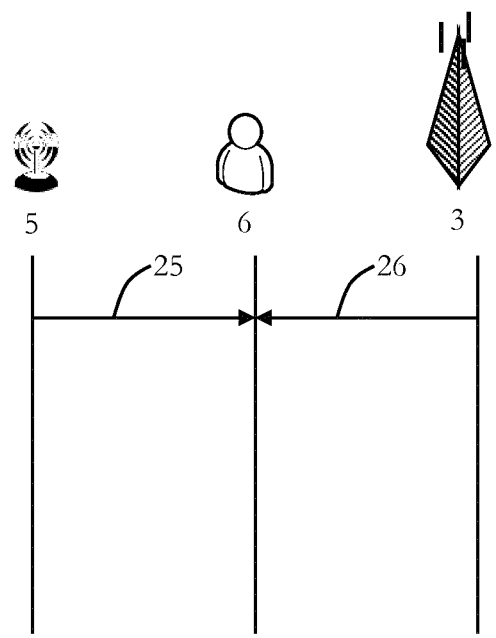
FIG. 4 illustrates a transmission scheme for system information pertaining to system information distribution.

As illustrated in FIG. 4, in some embodiments, each entity, e.g. LTE eNodeB 3 and NR eNodeB 5, in the same system information area will broadcast its system information area identifier by itself at 25 and 26, e.g. in the minimum system information. The UE 6 will judge whether it moves to a new area after accessing the system information of that entity.

Figure 5:
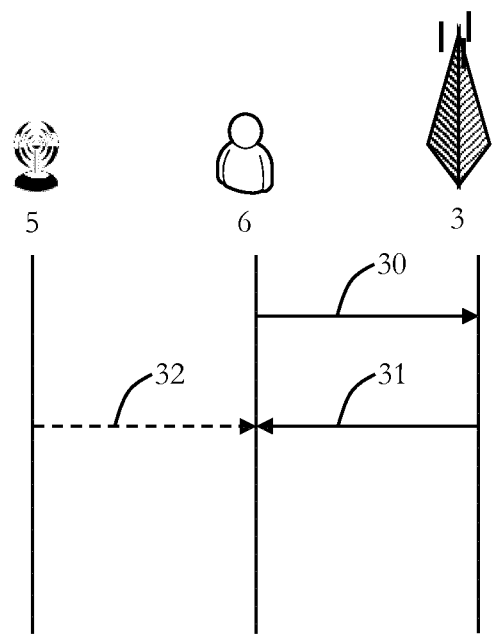
FIG. 5 illustrates a transmission scheme for system information pertaining to anchor cell configuration.

As illustrated in FIG. 5, based on the trigger of UL reference signal or measurement report sent by the UE 6 at 30, the system information area configuration can be transmitted at 31 by the LTE eNodeB 3 (and/or by the NR eNodeB 5 as indicated at 32 by the dashed arrow).

A UE 6 that wants to access or re-access the network (in IDLE, CONNECTED or INACTIVE CONNECTED), will start to send a UL reference signal as indicated at 30. After receiving this UL reference signal, there will be an entity, e.g. anchor cell 3 or 5, to send a feedback to the UE 6, which may include the system information area configuration and/or related system information.

If a network entity (could be the anchor cell 3 or the other central cell e.g. CU) determines, based on a measurement report received from a UE 6, that the UE 6 is approaching this, certain other entities (e.g. eNodeB 5), it will trigger the anchor cell, e.g. LTE eNodeB 3, to send the related system information of these cells, e.g. of NR eNodeB 5 cell, to the UE 6, as indicated at 31.

In the following, embodiments pertaining to the anchor cell configuration are discussed.

In a system information area, there may exist one or more anchor cells (e.g. either a further LTE eNdoeB 3 or, for example, an NR eNodeB 5 serves also as anchor cell).

The anchor cell may take the responsibility to distribute the system information area identifier and/or to transmit the system information of other cells in the system information area.

The anchor cell could be system information area specific, for example, it could be a central unit, or it could be the cell with widest coverage in a certain system information area, such as LTE cell 2 in the example of FIG. 1.

In another embodiment, the system information area could be service specific, e.g. all the neighbor cells which provide the same services, e.g. MBB or mMTC, will form a system information area. Then the common service/resource related system information will be transmitted by an anchor cell, e.g. LTE eNodeB 3.

In a system information area, more than one anchor cell may be located. For instance, in embodiments where, if the system information area is quite large, several anchor cells may be configured in order to improve the robustness and/or maintain the reception accuracy.

In embodiments with more than one anchor cell in a system information area, the transmission of system information can be realized by SFN (in this case, all the anchor cells will transmit the same system information), or different anchor cells will configure different broadcast channels e.g. according to cell id (in this case, different anchor cells may transmit the same or different system information).

One example of an embodiment in which different anchor cells transmit different system information is that, for example, an LTE anchor cell (e.g. LTE eNodeB 3) will serve UEs with only LTE radio and hence only collects system information of LTE cells, while in the same system information area, there is another NR anchor cell (e.g. 5*a*, 5*b* and 5*c* in FIG. 1) which serves all UEs such that it will collect system information of both NR and LTE cells.

In embodiments, where a combination of NR and LTE system information is provided in one anchor cell, the NR and the LTE SI can be separated in different SIBs (system information blocks), e.g. NR-SIB or LTE-SIB. In other embodiments, minimum system information includes an index tag to indicate which SIBs are LTE related and which SIBs are NR related.

In some embodiments, an indicator is provided, e.g. one bit, for indicating that the cell is an anchor cell (or not), wherein the indicator can be included, for example, in the minimum system information. With this indicator, a UE will know whether the system information of other cells will be expected in this cell or not.

In some embodiments, indicator of an anchor cell can be implicitly included, for example, in the synchronization signal of that cell, e.g. with special sequence group. Hence, even before the UE has access to the system information of that cell, the UE can decide whether it has to access that cell or not, based on the synchronization signal.

Figure 6:
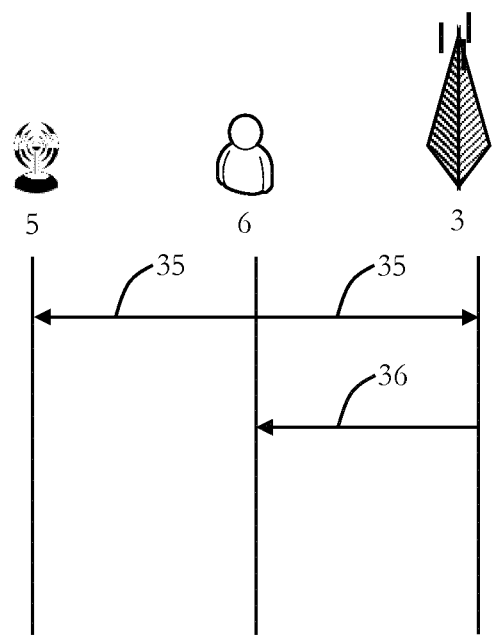
FIG. 6 illustrates a transmission scheme for system information pertaining to anchor cell configuration.

In some embodiments, as also illustrated in FIG. 6, a UE which wants to access/re-access the network (in IDLE, CONNECTED or INACTIVE CONNECTED) can start to send a UL reference signal at 35. After receiving this UL reference signal, there will be an entity, e.g. with the best radio link quality and exemplar LTE eNodeB 3 in FIG. 6, which sends a feedback to the UE 6 at 36, wherein the feedback can include the anchor SI cell information.

In the following, embodiments pertaining to system information provision within the same system information area are discussed.

Unlike in R2-164809 mentioned above, where four different scenarios depending on whether there is overlay node or whether there is common SI between different nodes are discussed, in some embodiments a common framework to distribute the system information is provided.

Figure 7:
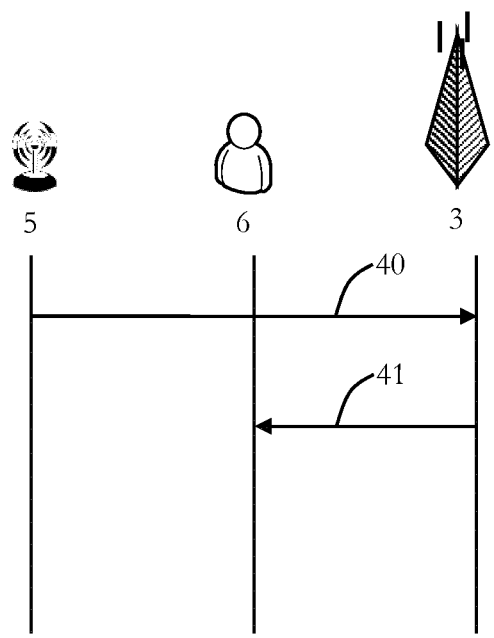
FIG. 7 illustrates a transmission scheme for system information pertaining to system information provision within the same system information area.

As also illustrated in FIG. 7, the anchor cell, e.g. LTE eNodeB 3, at 40 collects the minimum system information or scheduling information of the other cells, e.g. NR eNodeB 5, in the same system information area, and then distributes them to the UEs at 41.

In the following, embodiments are discussed which pertain to providing the other system information besides the minimum system information.

In some embodiments, the other system information transmission is triggered by a UE's request.

Figure 8:
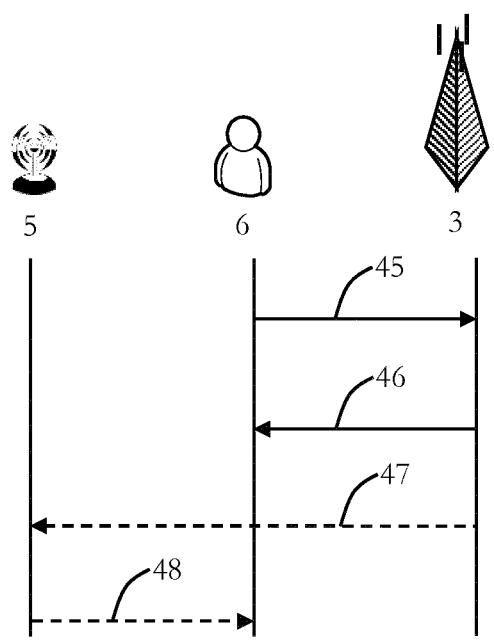
FIG. 8 illustrates a transmission scheme for system information triggered by a UE's request.

As illustrated in FIG. 8, at 45, the UE 6 will send the request to anchor cell, e.g. LTE eNodeB 3. The request may contain what kind of SIBs and/or target cell are expected.

Depending on the request, the anchor cell, e.g. LTE eNodeB 3, will broadcast or unicast at 46 the related SIBs to the UE 6.

Alternatively (or additionally), the anchor cell, e.g. LTE eNodeB 3, will notify the target cell, e.g. NR eNodeB 5, at 47, of demanding SIBs and then the target cell, e.g. NR eNodeB 5, will broadcast or unicast it to the UE 6 at 48.

Figure 9:
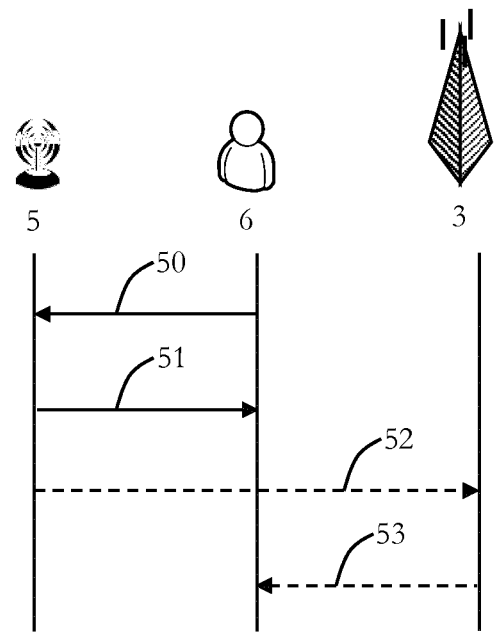
FIG. 9 illustrates a transmission scheme for system information triggered by a UE's request.

As illustrated in FIG. 9, in an alternative embodiment, the UE 6 will send the request to the target cell, e.g. NR eNodeB 5, at 50. Then, depending on the request, the target cell, e.g. NR eNodeB 5, will broadcast or unicast the requested information to the UE 6 at 51.

Alternatively (or additionally), the target cell, e.g. NR eNodeB 5, notifies the anchor cell, e.g. LTE eNodeB 3, of this request at 52, and then, depending on the request, the anchor cell, e.g. LTE eNodeB 3, broadcasts or unicasts the requested information to the UE 6 at 53.

In both alternatives of FIGS. 8 and 9, the broadcast by the anchor cell may also be supported. A potential scenario is that the same request is received from UEs located within different target cells, then broadcasting of the respective information by the anchor cell may be a better choice than by transmitting the system information by each target cell individually.

In some embodiments, the other system information transmission can be triggered by the network side.

Figure 10:
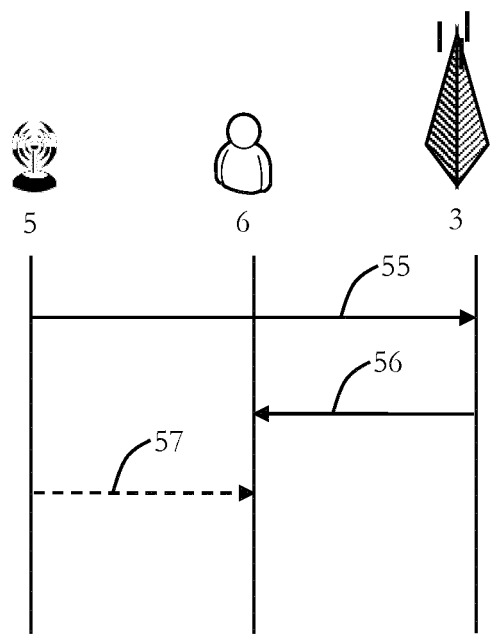
FIG. 10 illustrates a transmission scheme for system information triggered by the network.

As also illustrated in FIG. 10, in such embodiments, the target cell, e.g. NR eNodeB 5, sends the related SIBs to the anchor cell at 55, e.g. LTE eNodeB 5, and the anchor cell, e.g. eNodeB 5, broadcasts/unicasts it at 56 to the UE 6.

Alternatively, the target cell, e.g. NR eNodeB 5, broadcasts/unicasts it by itself at 57.

In the following, embodiments pertaining to provision of system information across different system information areas are discussed.

Figure 11:
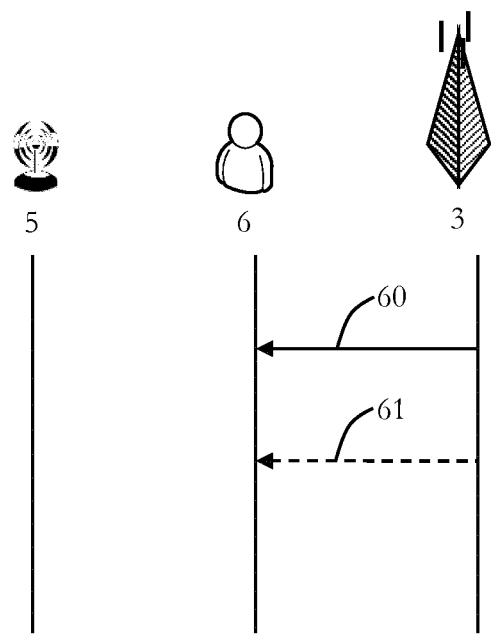
FIG. 11 illustrates a transmission scheme for system information pertaining to system provision across different system information areas.

As also illustrated in FIG. 11, if the UE 6 accesses a cell in a different system information area via handover, then in the handover command, which is transmitted at 60, e.g. by the LTE eNodeB 3, the new system information area identifier and/or its configurations (e.g. cell list) as well as the anchor cell ID will be included in the handover command.

If the UE is in IDLE or INACTIVE CONNECTED state and moves to a new system information area, it will detect it from the system information area identifier in the broadcast system information (at 62) or from the cell ID which is not in the previous system information area cell list. If the UE knows the anchor cell ID, e.g. from a synchronization signal or feedback to UL reference signal as shown in previous examples, the UE can access the anchor cell and get the system information directly from the anchor cell, e.g. LTE eNodeB 3.

In the following, embodiments pertaining to a system information area re-configuration are discussed.

In some embodiments, a dynamic system information area configuration is supported. The dynamic configuration includes e.g. split/merge of system information area, change of anchor cell in the system information area, add/delete cell, for example, a newly activated UE cell in one system information area, network load etc.

Figure 12:
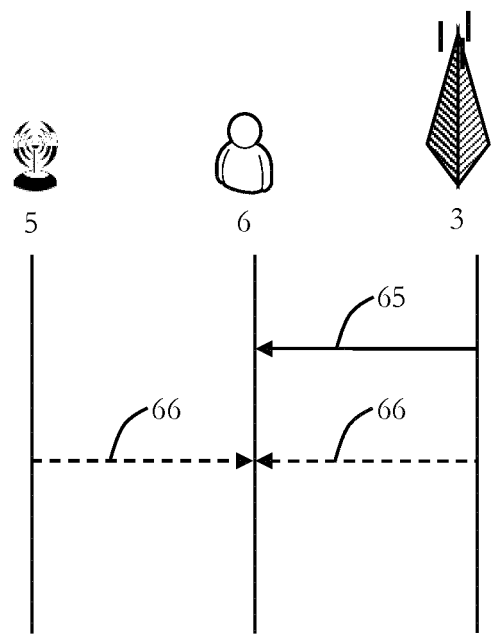
FIG. 12 illustrates a transmission scheme for system information pertaining to system information area re-configuration.

As also illustrated in FIG. 12, after changing the system information area configuration, then depending on the adopted alternatives, the anchor cell, e.g. LTE eNodeB 3 (see also FIGS. 3, 4 and 5 above), in the new configured area sends an updated configuration in the minimum system information at 65.

Alternatively, each cell, e.g. LTE eNodeB3 and NR eNodeB5, in the new configured area (e.g. FIG. 5 above) will send updated configuration at 66 (and may also indicate if there is a change before the update) in the minimum system information.

For the UEs in IDLE or INACTIVE state, the paging message can be used to indicate new system information area related configuration and/or updated system information.

Some embodiments focus on system information transmission/reception for future communication system. With some of the proposed schemes, the signaling overhead to receive system information may be reduced and the SI transmission/reception efficiency may be improved as well.

In the following, an embodiment of a general purpose computer 130 is described under reference of FIG. 13. The computer 130 can be implemented such that it can basically function as any type of entity, base station or new radio base station, transmission and reception point, or user equipment as described herein. The computer has components 131 to 140, which can form a circuitry, such as any one of the circuitries of the entities, base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station, and user equipment.

At the input/output interface 134 several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS and LTE.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding. For example, the ordering in FIGS. 2 to 12 may be exchanged.

Figure 13:
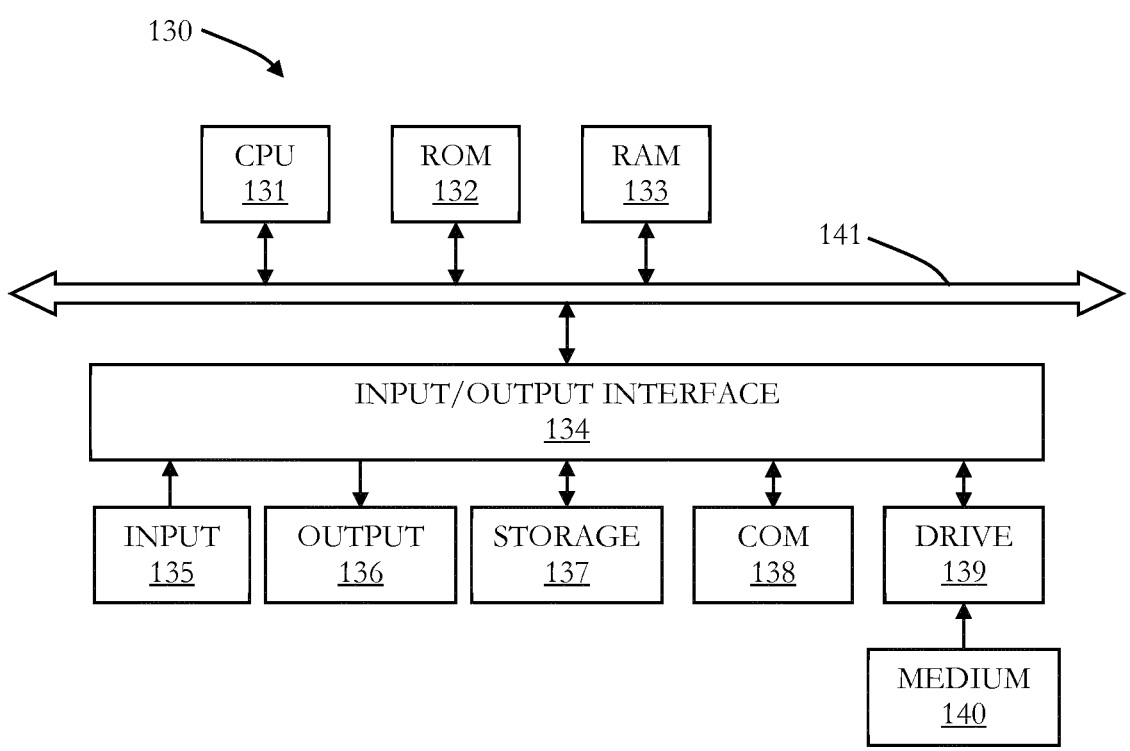
FIG. 13 illustrates schematically a general purpose computer which may be used for implementing an entity or user equipment as described herein.

Please note that the division of the control or circuitry of FIG. 13 into units 131 to 140 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A mobile telecommunications system anchor entity for a mobile telecommunications system including at least one entity serving at least one user equipment, wherein the at least one entity and the at least one user equipment are located in a common system information area, comprising circuitry configured to:

transmit minimum system information to the at least one user equipment, wherein the minimum system information includes system information area identifier information.

(2) The mobile telecommunications system anchor entity of (1), wherein the minimum system information includes information about entities within the system information area.

(3) The mobile telecommunications system anchor entity of (1) or (2), wherein the circuitry is further configured to transmit information about entities within the system information area on demand to the at least one user equipment.

(4) The mobile telecommunications system anchor entity of (3), wherein the information about entities is transmitted based on at least one of moving speed and moving direction of the user equipment.

(5) The mobile telecommunications system anchor entity of anyone of (1) to (4), wherein each entity in the system information area transmits the minimum system information.

(6) The mobile telecommunications system anchor entity of anyone of (1) to (5), wherein the minimum system information is transmitted upon detection of at least one of an uplink reference signal or measurement report from the user equipment.

(7) The mobile telecommunications system anchor entity of (6), wherein the user equipment is in at least one of the following states: idle, connected and inactive connected.

(8) The mobile telecommunications system anchor entity of anyone of (1) to (7), wherein the circuitry is configured to transmit the system information area identifier information.

(9) The mobile telecommunications system anchor entity of (8), wherein the circuitry is further configured to transmit system information of other entities located within the system information area.

(10) The mobile telecommunications system anchor entity of (8) or (9), wherein the circuitry is further configured to transmit system information which is common with other entities of the system information area.

(11) The mobile telecommunications system anchor entity of (10), wherein the common system information includes common service system information.

(12) The mobile telecommunications system anchor entity of (10) or (11), wherein the common system information includes common resource related information.

(13) The mobile telecommunications system anchor entity of anyone of (8) to (12), wherein another anchor entity is located within the system information area and wherein the circuitry is further configured to perform the transmission of the minimum system information based on at least one of: a single frequency network for the at least two anchor entities or different broadcast channels for the at least two anchor entities.

(14) The mobile telecommunications system anchor entity of (13), wherein the entity is a first mobile telecommunications system entity and the other anchor entity is a second mobile telecommunications system entity, and wherein the transmitted minimum system information includes system information for the first mobile telecommunications system and for the second mobile telecommunications system.

(15) The mobile telecommunications system anchor entity of anyone of (1) to (14), wherein the minimum system information includes an indicator for indicating an anchor cell.

(16) The mobile telecommunications system anchor entity of anyone of (1) to (15), wherein a synchronization signal includes an indicator for indicating an anchor cell.

(17) The mobile telecommunications system anchor entity of anyone of (1) to (16), wherein the circuitry is further configured to transmit, in response to receiving an uplink reference signal, anchor entity system information.

(18) The mobile telecommunications system anchor entity of anyone of (1) to (17), wherein the system information area configuration can be changed dynamically.

(19) The mobile telecommunications system anchor entity of (18), wherein dynamic change of the system information area configuration includes at least one of: splitting the system information area, merging system information areas, changing an anchor entity in the system information area, adding a cell to the system information area, removing a cell from the system information area.

(20) The mobile telecommunications system anchor entity of (18) or (19), wherein the circuitry is further configured to transmit updated system information included in the minimum system information in response to a change of the system information area configuration.

(21) The mobile telecommunications system anchor entity of anyone of (18) to (20), wherein the circuitry is further configured to transmit updated system information in a paging message in response to a change of the system information area configuration.

(22) A mobile telecommunications system entity for a mobile telecommunications system including at least one anchor cell entity serving at least one user equipment, wherein the at least one entity and the at least one user equipment are located in a common system information area and wherein the at least one anchor cell entity transmits minimum system information to the at least one user equipment, comprising circuitry configured to:

transmit at least one of other system information and scheduling information to the at least one user equipment.

(23) The mobile telecommunications system entity of (22), wherein the other system information or scheduling information is transmitted in response to the receipt of a request transmitted from the at least one user equipment.

(24) The mobile telecommunications system entity of (23), wherein the request is transmitted to the entity being configured as an anchor entity.

(25) The mobile telecommunications system entity of (24), wherein the content of the other system information is based on the request.

(26) The mobile telecommunications system entity of (24), wherein the anchor entity notifies another entity to transmit the other system information.

(27) The mobile telecommunications system entity of anyone of (23) to (26), wherein the request is transmitted to the entity being configured as a target entity.

(28) The mobile telecommunications system entity of (27), wherein the circuitry is further configured, depending on the request, to unicast or broadcast the other system information to the user equipment.

(29) The mobile telecommunications system entity of (27) or (28), wherein the circuitry is further configured to notify the anchor entity to transmit the other system information.

(30) A mobile telecommunications system entity for a mobile telecommunications system including at least one anchor cell entity serving at least one user equipment, wherein the at least one entity and the at least one user equipment are located in a common system information area and wherein the at least one anchor cell entity transmits minimum system information to the at least one user equipment, comprising circuitry configured to:

transmit in a handover command at least one of a new system information area identifier, configuration information and an anchor entity identification.

(31) A user equipment for a mobile telecommunications system including at least one entity serving the user equipment, wherein the at least one entity and the user equipment are located in a common system information area, the user equipment comprising circuitry configured to:

receive minimum system information including system information area identifier information; and determine, based on the received system information area identifier information, whether a new system information area is entered.

(32) The user equipment (31), wherein the circuitry is further configured to receive information about entities within the system information area.

(33) The user equipment of (32), wherein the circuitry is further configured to request the information about entities within the system information area.

(34) The user equipment of anyone of (31) to (33), wherein the circuitry is further configured to transmit at least one of an uplink reference signal and a measurement report.

The invention claimed is:

1. A mobile telecommunications system anchor entity for a mobile telecommunications system including at least one entity serving at least one user equipment, wherein the at least one entity and the at least one user equipment are located in a system information area, comprising circuitry configured to: transmit minimum system information to the at least one user equipment, wherein the minimum system information includes system information area identifier information, wherein the circuitry is further configured to transmit information about entities within the system information area on demand to the at least one user equipment, and the information about entities is transmitted based on at least one of moving speed and moving direction of the user equipment.

2. The mobile telecommunications system anchor entity of claim 1, wherein each entity in the system information area transmits the minimum system information.

3. The mobile telecommunications system anchor entity of claim 1, wherein the minimum system information is transmitted upon detection of at least one of an uplink reference signal or measurement report from the user equipment.

4. The mobile telecommunications system anchor entity of claim 3, wherein the user equipment is in at least one of the following states: idle, connected and inactive connected.

5. The mobile telecommunications system anchor entity of claim 1, wherein the circuitry is configured to transmit the system information area identifier information.

6. The mobile telecommunications system anchor entity of claim 5, wherein the circuitry is further configured to transmit system information of other entities located within the system information area.

7. The mobile telecommunications system anchor entity of claim 5, wherein the circuitry is further configured to transmit system information which is common with other entities of the system information area.

8. The mobile telecommunications system anchor entity of claim 7, wherein the common system information includes common service system information.

9. The mobile telecommunications system anchor entity of claim 7, wherein the common system information includes common resource related information.

10. The mobile telecommunications system anchor entity of claim 5, wherein another anchor entity is located within the system information area and wherein the circuitry is further configured to perform the transmission of the minimum system information based on at least one of: a single frequency network for the at least two anchor entities or different broadcast channels for the at least two anchor entities.

11. The mobile telecommunications system anchor entity of claim 10, wherein the anchor entity is a first mobile telecommunications system entity and the other anchor entity is a second mobile telecommunications system entity, and wherein the transmitted minimum system information includes system information for the first mobile telecommunications system entity and for the second mobile telecommunications system entity.

12. The mobile telecommunications system anchor entity of claim 1, wherein the system information area configuration can be changed dynamically.

13. The mobile telecommunications system anchor entity of claim 1, wherein the minimum system information includes information about entities within the system information area.

14. A method performed by a mobile telecommunications system anchor entity for a mobile telecommunications system including at least one entity serving at least one user equipment, wherein the at least one entity and the at least one user equipment are located in a system information area, the method comprising: transmitting minimum system information to the at least one user equipment, wherein the minimum system information includes system information area identifier information; and transmitting information about entities within the system information area on demand to the at least one user equipment, wherein the information about entities is transmitted based on at least one of moving speed and moving direction of the user equipment.

15. The method of claim 14, wherein
the minimum system information includes information about entities within the system information area.

16. The method of claim 14, wherein
each entity in the system information area transmits the minimum system information.

17. The method of claim 14, wherein
the minimum system information is transmitted upon detection of at least one of an uplink reference signal or measurement report from the user equipment.

18. An anchor entity for a mobile telecommunications system including at least one entity serving at least one user equipment, wherein the at least one entity and the at least one user equipment are located in a system information area, the anchor entity comprising: circuitry configured to transmit minimum system information to the at least one user equipment, wherein the minimum system information includes system information area identifier information; and transmit information about entities within the system information area on demand to the at least one user equipment, wherein the information about entities is transmitted based on at least one of moving speed and moving direction of the user equipment.

19. The anchor entity of claim 18, wherein
the minimum system information includes information about entities within the system information area.

20. The anchor entity of claim 18, wherein
the minimum system information is transmitted upon detection of at least one of an uplink reference signal or measurement report from the user equipment.

* * * * *